Nov. 27, 1934.	E. F. LOWEKE	1,982,441
UNIVERSAL JOINT
Filed March 9, 1932
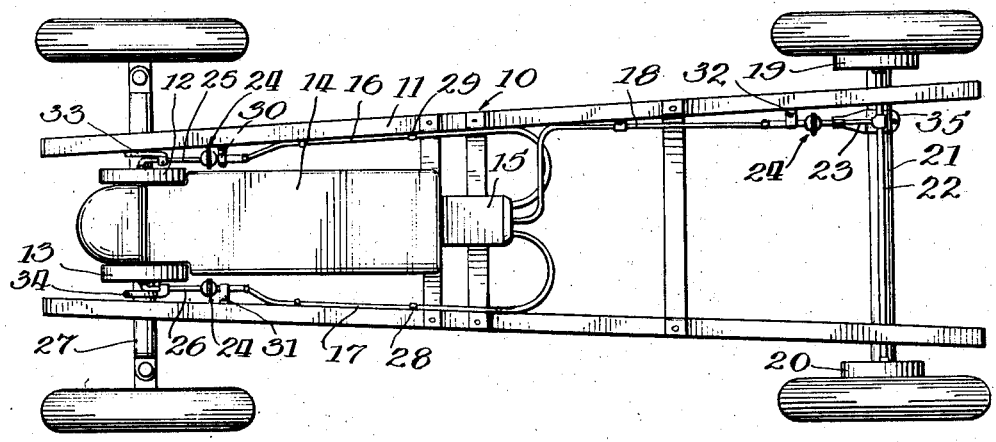
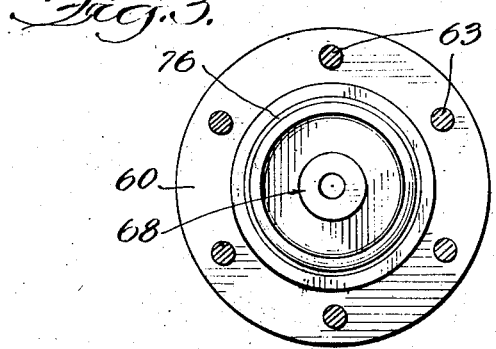
Inventor:
Erwin F. Loweke
By Williams, Bradbury,
McCalet & Hinkle. Attys.

Patented Nov. 27, 1934

1,982,441

UNITED STATES PATENT OFFICE 1,982,441

UNIVERSAL JOINT

Erwin F. Loweke, Detroit, Mich., assignor to Hydraulic Brake Company, Detroit, Mich., a corporation of California Application March 9, 1932, Serial No. 597,699

2 Claims. (Cl. 285—91)

The present invention relates to an improved universal joint and a hydraulic brake system including the universal joint.

The universal pipe joints of the prior art have not been suitable for hydraulic brake systems by reason of the fact that they are incapable of meeting the rigorous requirements of hydraulic brake service. A hydraulic universal joint for this service should be as nearly leak-proof and fluid tight as it is possible to make the universal joint, in order to prevent the loss of the hydraulic fluid and to assure the proper actuation of the brakes at all times. The importance of the perfect functioning of every part of a hydraulic brake system will be evident when it is considered that the failure of such an element may result in the destruction of valuable property and the loss of human life.

In the hydraulic brake systems of the prior art flexible hose or conduits have commonly been used to accomplish a connection between movable parts of the brake system and those relatively immovable parts which are carried by the frame.

Such flexible conduits are necessarily also somewhat variable in their volume, since a flexible wall may expand slightly under fluid pressure and since the volume of a round flexible conduit decreases when the conduit is bent sharply so as to slightly flatten the conduit.

One of the objects of the present invention is the provision of an improved hydraulic brake system, the conduits of which are adapted to provide a substantially constant volume or space for the hydraulic fluid under all conditions of operation so as to eliminate the possibility of variation in brake operation which might be due to variation in volume of the conduits.

Another object of the invention is the provision of an improved brake system including relatively rigid inexpansible conduits and an improved hydraulic universal joint, which system is adapted to provide a greater factor of safety than the systems of the prior art.

Another object of the invention is the provision of an improved hydraulic joint for hydraulic conduits which is adapted to effect a substantially fluid tight joint betwen two relatively movable conduit members under the rigorous conditions of service which are present in hydraulic brake systems.

Another object of the invention is the provision of an extremely simple yet effective universal joint structure for hydraulic conduits or the like, by means of which the multiplicity of parts and the attendant difficulties and excessive cost of manufacture, which are present in devices of the prior art, may be eliminated.

Another object of the invention is the provision of an improved hydraulic universal joint which is capable of accomplishing the same or better results than the hydraulic universal joints of the prior art with a lesser number of elements, and a hydraulic universal joint which may be manufactured at such a low cost that it may be within the means of a vast number of users and economically incorporated in many different structures by reason of its simplicity and low cost.

Other objects and advantages of the invention will be apparent from the following description and from the accompanying drawing, in which similar characters of reference indicate similar parts throughout the several views.

Referring to the single sheet of drawings accompanying this description,

Fig. 1 is a diagrammatic bottom plan view of an automobile chassis equipped with a hydraulic brake system constructed according to the present invention;

Fig. 2 is an axial sectional view taken through a universal joint constructed according to the present invention;

Fig. 3 is a transverse sectional view taken through the universal joint on the plane of the line 3—3 of Fig. 2; and Fig. 4 is a fragmentary view similar to Fig. 2 of a modified form of universal joint construction.

Referring to Fig. 1, the embodiment which has been selected to illustrate the invention includes an automobile chassis, indicated in its entirety by the numeral 10, and including a frame 11.

The invention is applied to a chassis with a front wheel drive in which the brake drums 12 and 13 are disposed inside the frame 11 adjacent the engine 14.

Any type of suitable hydraulic brake mechanism may be employed in the brakes included in the drums 12 and 13, such as, for example, those disclosed in the prior applications of the assignee of this application. The brake system preferably includes a master cylinder 15 with a plurality of conduits 16, 17, and 18 leading from the master cylinder 15 to the brake drums 12, 13, 18, 19 and 20. Since the rear axle 21 is not a rotating axle, it may be provided with a transverse conduit 22, which communicates with the longitudinally extending conduit 23 connected to the conduit 18 through the universal joint 24. The front brake drums 12 and 13 are preferably provided with hydraulic conduits 25, 26 which communicate with the conduits 16 and 17 respectively through universal joints 24.

It should be understood that the conduits 16, 17 and 18 and master cylinder 15 are rigidly secured to the frame 11, while the conduits 23, 25 and 26 are movably supported with respect to the frame 10 by reason of their attachment to the axles 21, 27 which are movably supported with respect to the frame by means of the usual springs.

The universal joints 24 are intended to permit the necessary movement between that portion of the hydraulic brake system which moves with the axles and that portion which is rigidly secured to the frame, and it will be noted that by means of the present system the flexible tubing or hose of the prior art may be entirely eliminated and all of the conduits may be made of relatively inexpansible metal tubing.

The changes in volume of the space for hydraulic fluid, which might result from the bending or expansion of the flexible tubing or the hose of the prior art, are not present in a brake system constructed according to the present invention.

Since the actuation of a hydraulic brake depends upon the transmission of hydraulic fluid under pressure to the brake cylinders or brake actuating members, it will be evident that any expansion of intermediate parts of the hydraulic conduit would prevent immediate response of the brakes and the fluid-tight inexpansible hydraulic fluid conducting system of the present invention assures a greater factor of safety and a more positive action and prompt response of the brakes.

The conduits 16, 17 and 18 are supported on the frame 11 by appropriate clamps or brackets 28, 29, 30, 31, 32, while the conduits 23, 25, 26 are supported on the axles by appropriate brackets 33, 34, 35.

Referring to Figs. 2 and 3, these are detail sectional views of the hydraulic universal joint for the hydraulic conduit included in the brake system of Fig. 1. The hydraulic universal joint preferably includes a pair of metallic tubular members 36, 37, which may be of substantially cylindrical shape and provided with axially extending cylindrical bores 38, 39. The brackets 31, 32 are provided with bifurcated clamping ends 40, 41 having semi-circular sockets for engaging the tubular members 36, 37, upon which they may be clamped by means of the screw bolt and nut 42.

In order to permit the necessary axial movement, one or both of the brackets 31, 32 may slidably engage the tubular members 36, 37, but only a limited amount of the movement takes place in the universal joint 24, and therefore in many embodiments of the invention the brackets 31, 32 may be clamped fixedly upon the tubular members 36, 37.

Referring to the left end of Fig. 2, either one or both of the tubular members 36 may be provided with an externally threaded portion 43 adapted to be engaged by the complementary internal threads of a ferrule 44. The end of the tubular member 36 is provided with a frusto-conical surface 45, and the end of the conduit 17, for example, is belled out into frusto-conical form at 46.

The ferrule 44 is provided with an axially located aperture 47 for passing the conduit 17 and with an internal frusto-conical surface 48 for engaging the outside of the expanded portion 46 of the tube 47. The metal tube 17 may thus be fixedly clamped to the end of the tubular member 36 by the ferrule 44 in such manner as to accomplish a substantially rigid fluid-tight joint between the tube 17 and the tube 36.

Similar connections may be effected between any other parts of the hydraulic system or between other parts of the universal joint and the hydraulic conduits, or the tubular members 36, 37 may extend directly to other parts of the system.

The tubular member 36 is provided with a substantially hemispherical integral formation 49 having a substantially hemispherical cavity 50. The ball formation 49 is provided with a radially extending attaching flange 51 having a flat seating surface 52 having a plurality of transverse bores 53.

The surface 52 is provided with an annular depression 54 bounded by a cylindrical wall 55 which is adapted to receive a complementary axially extending cylindrical formation 56 on the member 57. The member 57 comprises a partially spherical metal member having an interior surface 58 of spherical shape and having a flat end surface 59 adapted to engage the surface 54 on member 49. The spherical member 57 is provided with a radially extending attaching flange 60 having a flat surface 61 and a plurality of transverse bores 62. The members 49 to 57 may be firmly secured together by the screw bolts 63 which pass through the flange 51 and are threaded into the flange 60, thereby forming a ball having a cavity 64 which is machined to substantially perfect spherical shape.

The member 57 is provided with an axially extending aperture 65 which is substantially larger than the exterior of the tubular member 37 to permit a range of movement between the tubular member 37 and the ball socket 49—57.

The tubular member 37 is provided with a substantially hemispherical integral ball formation 66 through which the bore 39 passes. The end of the hemispherical member 66, which will be termed the "ball", is provided with a flat surface 67 and with an axially extending lug 68 surrounding the bore 39. Lug 68 is formed with a cylindrical surface 69 and with a radially extending annular flange 70 providing the lug 68 with a head.

The ball 66 is provided with a simple yet extremely effective packing 71, consisting of a flexible member of substantially circular shape, having a centrally located bore 72 for receiving the lug 68. The packing 71 is provided with a tubular formation 73 surrounding the bore 72 and substantially filling the annular space between the flange 70 and the face 67 of the ball 66.

At its outer edge the packing 71 is provided with a substantially spherical surface 74 and with an outwardly projecting annular flange 75 which engages the wall of the cavity 64. The sealing flange 65 is beveled, as at 76, thereby providing a relatively sharp edge 77 which is adapted to be maintained in firm sealing engagement with the interior of the cavity 64, by the pressure of the fluid in the conduit.

The packing 71 may be made of resilient and flexible rubber, or it may consist of a cup leather or other material which is peculiarly adapted to withstand the action of the fluids which are used in such hydraulic brake systems.

Referring to Fig. 3, it will be observed that the bolts 63 are preferably disposed at regularly spaced points about the periphery of the flanges 51, 60. It will be evident that the ball 66 may be located in the socket 64 by moving the member 57, but when the parts are assembled as shown in Fig. 2 the ball 66 may rotate freely in the socket 64 and a fluid-tight joint is maintained between the bores 38, 39 by means of the packing 71.

The operation of the present hydraulic joint is as follows:

The fluid pressure within the bores 38 and 39 engages inside the annular packing 71 and forces the tubular flange 73 into close engagement with the lug 68. The pressure of the hydraulic fluid also forces the annular flange 59 into close engagement with the interior surface of the socket 64, and the ball 66 is thus adapted to rotate in its socket without permitting any leakage of hydraulic fluid. The relatively thin and sharp sealing edge 77 is readily susceptible to movement under the action of the hydraulic fluid under pressure, and the thin edge follows the formation of the socket very closely, effecting a close fluid-tight joint between the movable parts of the hydraulic joint.

Referring to Fig. 4, this is a modified form of construction for the hydraulic universal joint, which has the additional advantage of eliminating any possibility of longitudinal movement between the parts of the universal joint. In this embodiment many of the parts of the universal joint may be of the same construction as that previously described, and similar numerals have been applied to similar parts.

The ball 66, however, has been provided with a radially extending frusto-conical surface 78 for the purpose of providing a ball which comprises more than a hemisphere. It will be noted that the corner 79 between the surface 78 and the spherical surface of the ball is located past the vertical diameter passing through the center of the ball and that portion of the spherical surface which is at the left of the vertical diameter in Fig. 4 serves as a stop surface to prevent any motion of the ball toward the left with respect to the socket 49. The annular packing 79 may be similar in form to that previously described, except that its body is frusto-conical in form to correspond to the shape of the surface 78.

It will thus be observed that it is wholly unnecessary to employ any flexible tubing or hose and that the hydraulic conduits may be constructed wholly of relatively rigid and inexpansible tubing, thereby eliminating the possibility of change of volume of the conduits or expansion of the conduits under pressure.

The present hydraulic joint is adapted to maintain a fluid-tight joint for long periods of time without necessity for repair, and it may be constructed so strongly that there is no possibility whatever of bursting of the hydraulic conduit, as might be the case where it is necessary to provide a strong tubing which is also flexible.

The hydraulic joint is so simple in its construction and operation that it may be constructed at a very low cost, and the cost of construction of the hydraulic system may be substantially reduced over the cost which would be involved if the complicated hydraulic joints of the prior art were employed.

The present hydraulic joint includes a lesser number of elements, which perform all of the functions of the complicated hydraulic joints of the prior art more effectively and economically.

One of the most important features of the hydraulic joint is the elimination of the unnecessary and expensive parts of the devices of the prior art.

While I have illustrated and described a preferred embodiment of my invention, I contemplate that many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a universal joint for hydraulic brakes, the combination of a pair of complementary members conformed to provide a universal joint therebetween, means for preventing separation of said members, each of said members having a passage therethrough of small diameter relative to the diameter of said universal joint, one of said members having a face and a small tubular projection extending therefrom, a resilient washer adjacent said face, said washer having a surface in contact with said face and a second surface freely and completely exposed to fluid in said joint, said washer having a pair of flanges, one of said flanges being of appreciable length and having a curved outer surface conforming to and lying in contact with a spherical surface provided by one of said members, the other flange surrounding and extending along said projection, and a radially extending flange rigid with said projection and forming the sole means for attaching said washer to the member having said face.

2. In a device of the class described, the combination comprising a member having a passage therethrough and an enlargement provided with a substantially hemispherical external surface, a second member having a passage therethrough and provided with an enlargement having a substantially hemispherical internal surface, a ring having an internal surface forming a part of a sphere, means for interlocking said members to provide a universal joint capable of withstanding high fluid pressures, said passages being of small diameter relative to the diameter of said joint, said first-mentioned member having a frusto-conical face, said face intersecting said first-mentioned hemispherical surface in a line spaced from said ring, and a resilient washer having a base conforming to and lying in contact with said face, said washer having a side opposite said face freely exposed to fluid in said joint, said washer also having a pair of flanges, one of said flanges having a curved outer surface conforming to and in contact with said internal hemispherical surface, the other flange extending along and surrounding the passage in said first-mentioned member, and means preventing separation of said flange from said last-mentioned member and forming the sole means for interlocking said washer with said member.

ERWIN F. LOWEKE.